United States Patent
Yamada

(10) Patent No.: US 11,005,170 B2
(45) Date of Patent: May 11, 2021

(54) MILLIMETER-WAVE RADAR COVER

(71) Applicant: NOK CORPORATION, Tokyo (JP)

(72) Inventor: Takeshi Yamada, Fujisawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 16/292,814

(22) Filed: Mar. 5, 2019

(65) Prior Publication Data

US 2019/0207302 A1 Jul. 4, 2019

Related U.S. Application Data

(63) Continuation of application No. PCT/JP2017/032424, filed on Sep. 8, 2017.

(30) Foreign Application Priority Data

Sep. 8, 2016 (JP) .............................. JP2016-175127

(51) Int. Cl.
 *H01Q 1/42* (2006.01)
 *G01S 7/03* (2006.01)
(52) U.S. Cl.
 CPC ............... *H01Q 1/42* (2013.01); *G01S 7/032* (2013.01)
(58) Field of Classification Search
 CPC .......... H01Q 1/42; H01Q 1/526; H01Q 1/425; H01Q 15/0013; G01S 7/03; G01S 7/032; G01S 2007/027; G01S 7/02
 See application file for complete search history.

(56) References Cited

U.S. PATENT DOCUMENTS

| 5,955,752 A | 9/1999 | Fukaya et al. |
| 2003/0002045 A1 | 1/2003 | Nemat-Nasser et al. |
| 2008/0272955 A1* | 11/2008 | Yonak .................. H01Q 25/002 342/54 |

(Continued)

FOREIGN PATENT DOCUMENTS

| CN | 102760964 A | 10/2012 |
| CN | 102856655 A | 1/2013 |
| CN | 104466386 A | 3/2015 |

(Continued)

OTHER PUBLICATIONS

English translation of Written Opinion for corresponding International Application No. PCT/JP2017/032424 dated Nov. 28, 2017.

(Continued)

*Primary Examiner* — Dieu Hien T Duong
(74) *Attorney, Agent, or Firm* — Pearne & Gordon LLP

(57) ABSTRACT

A millimeter-wave radar cover housing a millimeter-wave radar including an antenna and an electronic circuit configured to drive the antenna includes: a first site provided in front of the millimeter-wave radar to protect the millimeter-wave radar and transmit millimeter waves emitted from the antenna; and a second site including a housing space in which the antenna and the electronic circuit except for the first site are housed. The first site is made of a stacked structural body obtained by stacking at least one layer of a first constituent material having a negative permittivity in the frequency band of the millimeter waves and a second constituent material having a positive permittivity in the frequency band of the millimeter waves.

5 Claims, 8 Drawing Sheets

(56) References Cited

U.S. PATENT DOCUMENTS

2011/0199281 A1* 8/2011 Morton .................. H01Q 1/422
343/872

FOREIGN PATENT DOCUMENTS

| DE | 198 30 791 A1 | 9/1999 | |
|---|---|---|---|
| DE | 19830791 A1 * | 9/1999 | ......... H01Q 15/0026 |
| JP | 11-004118 A | 1/1999 | |
| JP | 2013-102512 A | 5/2013 | |

OTHER PUBLICATIONS

International Preliminary Report on Patentability for corresponding International Application No. PCT/JP2017/032424 dated Mar. 12, 2019.
International Search Report for corresponding International Application No. PCT/JP2017/032424 dated Nov. 28, 2017.
Written Opinion for corresponding International Application No. PCT/JP2017/032424 dated Nov. 28, 2017.
Frerk Fitzek et al., "Automotive Radome Design—Fishnet Structure for 79 GHz", Germany Microwave Conference Digest of Papers, Berlin, Germany, IEEE, pp. 146-149, Mar. 15-17, 2010.
Extended European Search Report dated Mar. 18, 2020 for corresponding European Application No. 17848875.5.
Riad Yahiaoui et al., "Metalo-dielectric metamaterial for millimeter applications", Proceedings of the 42nd European Microwave Conference, Amsterdam, The Netherlands, Oct. 29-Nov. 1, 2012, pp. 667-670.

* cited by examiner (A)

(B)

| SITE / FREQUENCY BAND f | | A<br>FUNCTIONAL SITE AT WHICH RADAR WAVES ARE RECEIVED AND EMITTED | B<br>REMAINING SITE |
|---|---|---|---|
| I | MILLIMETER WAVE REGION (76 GHz FOR AUTOMOBILE RADAR) | TRANSMISSIVITY T = 1 | TRANSMISSIVITY T = 0 |
| II | EMC CONTROL REGION (1 GHz OR LOWER) | TRANSMISSIVITY T = 0 | TRANSMISSIVITY T = 0 |

FIG.11

MILLIMETER-WAVE RADAR COVER

CROSS REFERENCE TO RELATED APPLICATIONS

The present application is a continuation application of International Application No. PCT/JP2017/032424, filed on Sep. 8, 2017, which claims priority to Japanese Patent Application No. 2016-175127, filed on Sep. 8, 2016. The contents of these applications are incorporated herein by reference in their entirety.

BACKGROUND

Technical Field

The present disclosure relates to a millimeter-wave radar cover, and relates to a millimeter-wave radar cover housing a millimeter-wave radar for automotive application that enables automated driving of, for example, an automobile.

Background

A conventional millimeter-wave radar for automotive application includes an antenna configured to receive and emit electromagnetic waves, a drive circuit configured to drive the antenna, and an electronic circuit including a power source.

The size (dimensions) of the antenna configured to receive and emit electromagnetic waves depends on the type of the antenna, but in many cases, among antennas of the same type, an antenna at a higher frequency has a smaller size because electromagnetic waves at a higher frequency have a shorter wavelength. As for the electronic circuit, progress has been made in integration and refinement along with the progress of the semiconductor technology, and downsizing has exponentially proceeded, which is not limited to this field.

However, in a conventional low-frequency radar product or an electronic circuit mounted product in an era when the semiconductor technology had yet to develop, an antenna and an electronic circuit had large sizes (dimensions), and thus were housed separately or independently disposed in the same housing in many cases.

Along with downsizing of an antenna and an electronic circuit as electric components of a millimeter-wave radar, a radar cover capable of housing an antenna and an electronic circuit in the same housing has been disclosed (refer to Japanese Patent Application Laid-Open No. 2013-102512, for example).

As described above, since the antenna and the electronic circuit can be housed in the same housing or mounted close to each other, it is difficult to physically divide the antenna and the electronic circuit, and the boundary between the antenna and the electronic circuit is becoming unclear.

In design of a housing in which these components of a millimeter-wave radar are housed, the electromagnetic wave propagation characteristic of the housing needs to be considered to effectively utilize electromagnetic waves (millimeter waves) and reduce unnecessary radiation of electromagnetic waves, which is required for an electronic device.

When the antenna and the electronic circuit are separately housed or disposed independently from each other as in conventional cases, the housing can be designed only for each of the antenna and the electronic circuit while taking into consideration two viewpoints, effective utilization of the millimeter-wave radar and reduction of unnecessary radiation of electromagnetic waves.

However, in a recent millimeter-wave radar in which an antenna and an electronic circuit are mounted extremely close to each other due to the progress made in downsizing of the antenna and the electronic circuit, it is difficult to design a housing that simultaneously satisfies effective utilization of electromagnetic waves (millimeter waves) and reduction of unnecessary radiation of electromagnetic waves, which is requested for an electronic device.

Specifically, a different electromagnetic wave transmission property or screening property for the housing material is requested for each site of the millimeter-wave radar, and thus designing specifications of the housing material are different for each site. FIG. 11 lists requested designing specifications in a divided manner for sites A and B and frequency bands I and II.

Sites are divided into two in terms of transmission and screening of millimeter waves used by the millimeter-wave radar: a site A (part corresponding to a radome of the radar) at which electromagnetic waves (millimeter waves) are received and emitted; and the remaining site B in which the millimeter-wave radar is housed except for the site A.

Frequencies for which design is considered are functionally divided into two: a frequency band I (76.5 GHz) of a millimeter wave band used as electromagnetic waves; and a wide frequency band for which reduction of unnecessary radiation of electromagnetic waves and entry of electromagnetic waves from the outside are considered, in particular, a frequency band II (equal to or lower than approximately 1 GHz) of an electromagnetic compatibility (EMC) region (noise control region) of 1 GHz or lower. The frequency band I of the millimeter wave band is not limited to 76.5 GHz but may be optionally set in the range of 76 GHz to 81 GHz.

The transmissivity T of electromagnetic waves for the housing material when the sites A and B, the frequency band I (76.5 GHz), and the frequency band II (equal to or lower than approximately 1 GHz) are considered needs to be set for each of the sites A and B, the frequency band I (76.5 GHz), and the frequency band II (equal to or lower than approximately 1 GHz).

For example, in a region AI of the site A and the frequency band I (76.5 GHz), millimeter electromagnetic waves need to be transmitted to achieve the radar function of the millimeter-wave radar, and thus the transmissivity T of the housing material for the electromagnetic waves is desirably "1". The state in which the transmissivity T is "1" is the state of perfect transmission in which the housing material transmits electromagnetic waves.

In particular, in radar usage, electromagnetic waves theoretically attenuate proportionally to the square of the distance between an antenna of the millimeter-wave radar and an object. Thus, in terms of the round-trip distance between emission from the antenna and returning after reflecting on the object, the electromagnetic waves attenuate proportionally to the fourth power of the distance, and the transmissivity T of the housing material largely affects the performance (detection sensitivity, certainty, and accuracy) of a product.

For example, in a region BI of the site B and the frequency band I (76.5 GHz), transmission of millimeter electromagnetic waves does not need to be functionally allowed, but entry of millimeter waves needs to be prevented to avoid interference and cross talk due to electromagnetic waves from another external instrument. In other words, the transmissivity T of the housing material is desirably "0" to screen millimeter electromagnetic waves. The state in which the transmissivity T is "0" is the state of perfect screening in which the housing material transmits no electromagnetic waves.

In a region AII of the site A and the frequency band II (equal to or lower than approximately 1 GHz) and a region BII of the site B and the frequency band II (equal to or lower than approximately 1 GHz), the transmissivity T of the housing material is desirably "0" to screen, without transmission, electromagnetic waves in the frequency band II (equal to or lower than approximately 1 GHz) of the EMC region for reduction of unnecessary radiation of electromagnetic waves.

SUMMARY

At the site A of such a millimeter-wave radar housing having the above-described configuration, the transmissivity T of the housing material is desirably "1" in the frequency band I (76.5 GHz) and "0" in the frequency band II (equal to or lower than approximately 1 GHz), and completely opposite characteristics are requested for the frequency band I (76.5 GHz) and the frequency band II (equal to or lower than approximately 1 GHz).

However, no housing material simultaneously satisfies such opposite characteristics. Thus, conventionally, when a wavelength reduction effect due to the relative permittivity of the housing material is taken into consideration, design has been made prioritizing the radar function by using a housing having a thickness of integral multiples of the half wavelength of electromagnetic waves to be used, by setting "1" to the transmissivity T of the housing material for electromagnetic waves in the frequency band I (76.5 GHz), but with less consideration regarding setting "0" to the transmissivity T of the housing material for electromagnetic waves in the frequency band II (equal to or lower than approximately 1 GHz).

Thus, with a housing of the conventional material, it is possible to effectively utilize electromagnetic waves of a millimeter-wave radar, but it has been difficult to achieve sufficient reduction of unnecessary radiation of electromagnetic waves, which is required for an electronic device.

The present disclosure is intended to solve the above-described problem and provide a millimeter-wave radar cover capable of effectively utilizing electromagnetic waves of a millimeter-wave radar and sufficiently reducing unnecessary radiation of electromagnetic waves.

To achieve the above-described intention, the present disclosure provides a millimeter-wave radar cover housing a millimeter-wave radar including an antenna and an electronic circuit configured to drive the antenna, the millimeter-wave radar cover being characterized by including a first site provided in front of the millimeter-wave radar to protect the millimeter-wave radar and transmit millimeter electromagnetic waves emitted from the antenna; and a second site including a housing space in which the antenna and the electronic circuit except for the first site are housed wherein the first site is made of a stacked structural body obtained by stacking at least one layer of a first constituent material having a negative permittivity in the frequency band of the millimeter waves and a second constituent material having a positive permittivity in the frequency band of the millimeter waves.

The millimeter-wave radar cover according to the present disclosure is characterized in that: the first constituent material is formed by geometrically disposing a conductive material; and the stacked structural body has an effective transmissivity close to one for the frequency band of the millimeter waves when the first constituent material is stacked with the second constituent material.

The millimeter-wave radar cover according to the present disclosure is characterized in that the stacked structural body has an effective transmissivity close to zero for the frequency band of an electromagnetic compatibility (EMC) region lower than the frequency band of the millimeter waves.

The millimeter-wave radar cover according to the present disclosure is characterized in that the first constituent material is made of a conductive material formed in a lattice shape or a hole array shape.

The millimeter-wave radar cover according to the present disclosure is characterized in that the second constituent material is made of a dielectric material that protects the antenna and the electronic circuit from the outside.

The millimeter-wave radar cover according to the present disclosure is characterized in that the second site has a transmissivity of "0" for perfect screening in the frequency band of the millimeter waves and the frequency band of the EMC region.

The present disclosure can achieve a millimeter-wave radar cover capable of effectively utilizing electromagnetic waves of a millimeter-wave radar and sufficiently reducing unnecessary radiation of electromagnetic waves.

BRIEF DESCRIPTION OF DRAWINGS

FIG. 11 Table listing transmissivity requested for each of sites A and B of the millimeter-wave radar cover and each of frequency bands I and II.

DETAILED DESCRIPTION

Embodiment

The following specifically describes an embodiment of the present disclosure with reference to the accompanying drawings. In the description, for the purpose of illustration, the direction of arrow "a" points to the front surface side of a millimeter-wave radar cover 1 in FIGS. 1 and 2, and the direction of arrow "b" points to the back surface side thereof.

Entire Configuration of Millimeter-Wave Radar Cover

Figure 1:
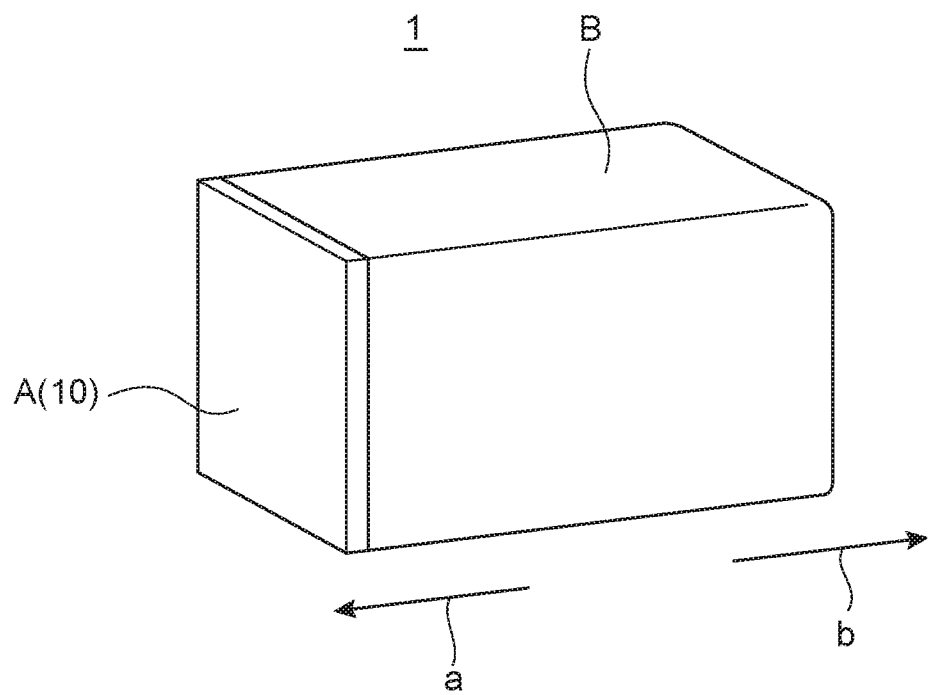
FIG. 1 A simplified perspective view illustrating the entire configuration of a millimeter-wave radar cover according to an embodiment of the present disclosure.
Figure 2:
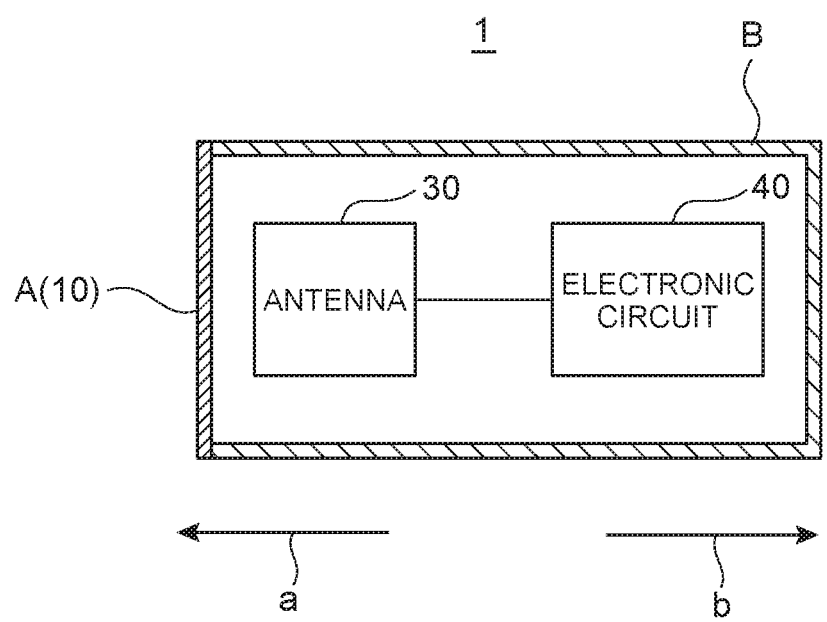
FIG. 2 A simplified cross-sectional view illustrating the millimeter-wave radar cover and an antenna and an electronic circuit housed therein.

As illustrated in FIGS. 1 and 2, the millimeter-wave radar cover 1 is a housing that houses: an antenna 30 configured to receive and emit electromagnetic waves of, for example, 76.5 GHz in the frequency band (30 to 300 GHz) of millimeter waves; and an electronic circuit 40 including, for example, a drive circuit configured to drive the antenna 30 and a power source, and protects these components from the outside.

The millimeter-wave radar cover 1 includes a first site A corresponding to a radome disposed in front of the antenna 30 configured to receive and emit electromagnetic waves, and a second site B corresponding to an accommodating part having a bottomed rectangular tubular shape and including an accommodating space in which the antenna 30 and the electronic circuit 40 except for the first site A are housed.

Figure 3:
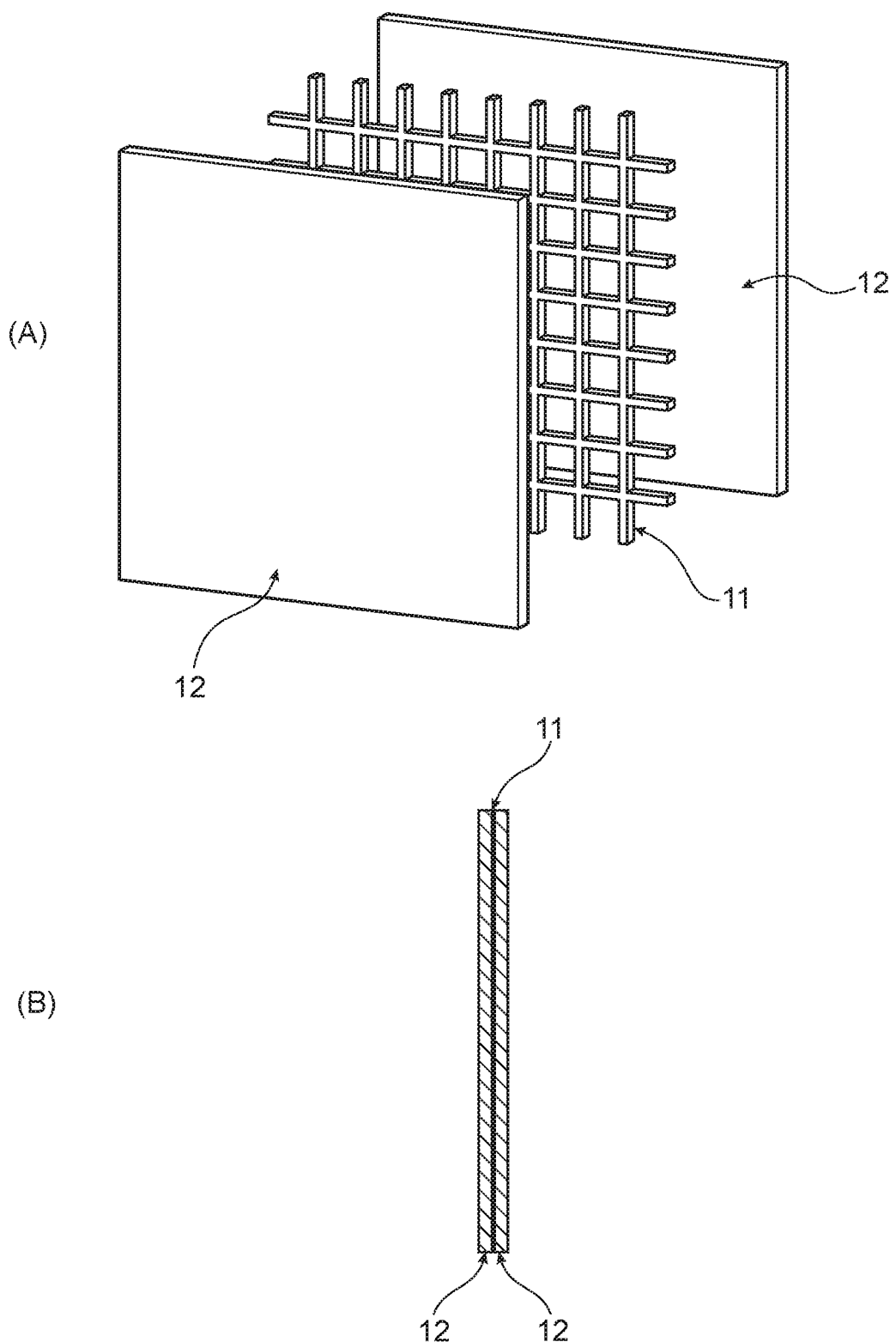
FIG. 3 A simplified perspective view and a cross-sectional view illustrating a first constituent material and a second constituent material of a stacked structural body forming a radome of the millimeter-wave radar cover.

As illustrated in FIGS. 3 (A) and (B), the first site A of the millimeter-wave radar cover 1 is a three-layer stacked structural body 10 obtained by stacking a first constituent material 11 and second constituent materials 12 sandwiching the first constituent material 11 therebetween on the front surface side (the direction of arrow "a") and the back surface side (the direction of arrow "b").

The second site B of the millimeter-wave radar cover 1 is formed of a shield material made of metal such as iron or a composite material obtained by providing, for example, resin with metal plating, and reduces unnecessary radiation of electromagnetic waves from the electronic circuit 40 and prevents interference and cross talk due to an external electronic device. Thus, the transmissivity T of the second site B is "0" in any of a frequency band I (76.5 GHz) of millimeter waves and a frequency band II (equal to or lower than approximately 1 GHz) of an EMC region.

As described above, the first site A needs to allow passing of millimeter waves in the frequency band I (76.5 GHz) of a millimeter wave band to achieve the radar function of a millimeter-wave radar, and thus the transmissivity T of the stacked structural body 10 for electromagnetic waves at the first site A is desirably "1". The transmissivity T of the stacked structural body 10 at the second site B is desirably "0" in order to screen electromagnetic waves in the frequency band II (equal to or lower than approximately 1 GHz) of the EMC region (noise control region) without transmission, thereby reducing unnecessary radiation of electromagnetic waves.

Configuration of Stacked Structural Body

Completely opposite characteristics such that the transmissivity T at the first site A is "1" in the frequency band I (76.5 GHz) of millimeter waves and "0" in the frequency band II (equal to or lower than approximately 1 GHz) of the EMC region are required as described above. No material satisfies the opposite requests, and thus, the stacked structural body 10 as an artificial material is used in the present disclosure.

As illustrated in FIG. 3, the stacked structural body 10 includes the first constituent material 11 and the second constituent materials 12 as a housing that simultaneously satisfies the effective transmissivity T of "1" in the frequency band I (76.5 GHz) of millimeter waves and the effective transmissivity T of "0" in the frequency band II (equal to or lower than approximately 1 GHz) of the EMC region. However, the transmissivity T of "1" or "0" is a value in theory, and values thereof that can be actually achieved and evaluated are defined as follows: the transmissivity T of "1" is a transmissivity T equal to or higher than 0.99 (−0.1 dB) and close to one; and the transmissivity T of "0" is a transmissivity T equal to or lower than 0.1 (−20 dB) and close to zero.

As illustrated in FIGS. 3 (A) and (B), the stacked structural body 10 in this case has a three-layer sandwich structure in which the first constituent material 11 is sandwiched between the second constituent material 12 disposed on the front surface side (the direction of arrow "a") and the second constituent material 12 disposed on the back surface side (the direction of arrow "b") and is integrally formed by, for example, an adhesive. However, the stacked structural body 10 is not limited thereto, but may have a double-layer structure as long as at least one second constituent material 12 and at least one first constituent material 11 are stacked, or may have a multiple-layer stacked structural body in which a plurality of second constituent materials 12 and a plurality of first constituent materials 11 are stacked in a total of four or more layers.

Figure 4:
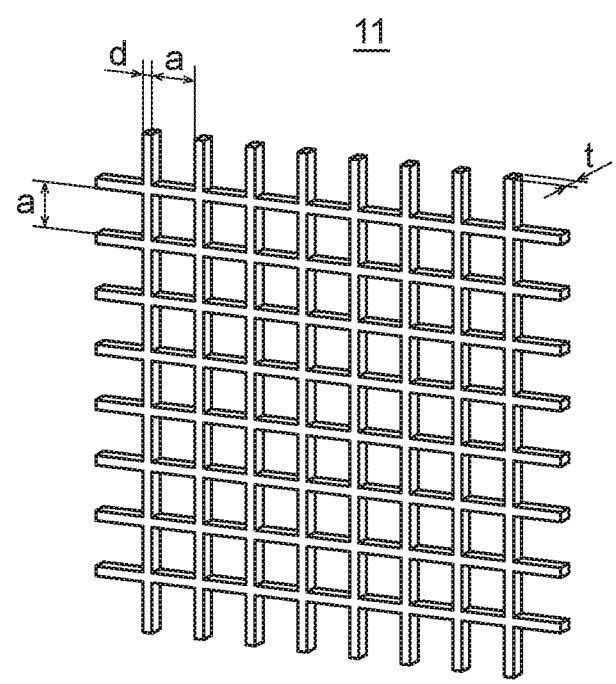
FIG. 4 A simplified perspective view illustrating the configuration of the second constituent material made of a conductive material in a lattice shape.

As illustrated in FIG. 4, the first constituent material 11 is a conductive material of electronic conduction, such as copper (metal) having a rectangular shape as a whole, and formed in a lattice shape resembling that of a screen door by using, for example, copper metal wires. The first constituent material 11 is not limited to a rectangular shape but may have any other kind of shape such as a circular shape or an ellipse shape in accordance with the shape of the radar. The conductive material of the first constituent material 11 is not limited to metal such as copper, but may be carbon, a conductive macromolecule, a conductive polymer, or the like, or a material provided with conductivity by mixing each of these materials (metal, carbon, a conductive macromolecule, a conductive polymer, or the like) into resin, rubber, elastomer, or the like.

Specifically, in the first constituent material 11, for example, the size of the lattice and the quantity thereof are determined by a thickness t of each frame forming the lattice, a width d of the frame, and an array interval a of the frame. The array interval a is the distance between inner ends of adjacent frames forming the lattice, but is not limited thereto. The array interval a may be the intercentral distance between the centers of the frames.

Each second constituent material 12 is formed of a resin (such as polyimide, polytetrafluoroethylene, or polyethylene) or a dielectric such as rubber having material strength and resistance necessary to be a housing of the millimeter-wave radar cover 1. Similarly to the first constituent material 11, the second constituent material 12 has a rectangular shape as a whole, and has a size identical to that of the first constituent material 11 or a size slightly larger than that of the first constituent material 11 to avoid protrusion of the first constituent material 11.

Figure 5:
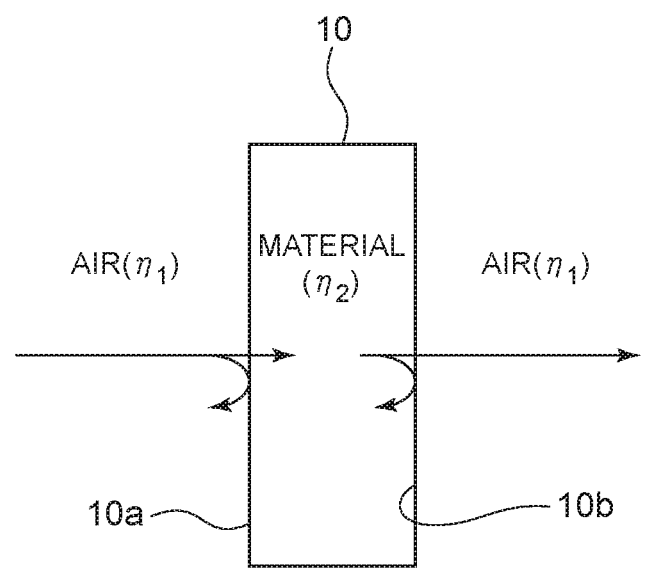
FIG. 5 A simplified diagram for description of transmissivity and reflectance.

As illustrated in FIG. 5, the stacked structural body 10 is disposed in a free space, which is a situation in which reflection of electromagnetic waves radiated from the antenna 30 occurs at two interfaces of a surface 10a of the stacked structural body 10 on the front surface side (the direction of arrow "a") and an internal surface 10b of the stacked structural body 10.

In such a situation, the transmissivity T of the stacked structural body 10 disposed in the free space has a relation to the reflectance Γ, which is determined by the wave impedances η of different materials such as air and the stacked structural body 10 as indicated by Expression (1) below. Specifically, the transmissivity T of the stacked structural body 10 is determined by a wave impedance η1 of the free space (air) and the equivalent wave impedance η2 of the stacked structural body 10. The reflectance Γ is given by (η2−η1)/(η2+η1).

$$T = 1 + \Gamma$$
$$= 1 + (\eta 2 - \eta 1)/(\eta 2 + \eta 1)$$
$$= 2 \cdot \eta 2 /(\eta 2 + \eta 1) \quad (1)$$

T: transmissivity
Γ: reflectance
η1: wave impedance of incident side material (air)
η2: wave impedance of radiation side material (stacked structural body 10)

Expression (1) indicates that the transmissivity T="1" can be obtained by equalizing the wave impedance η1 of the incident side material (air) and the wave impedance η2 of the radiation side material (stacked structural body 10). This means conversely that the transmissivity T≈"0" can be obtained when the wave impedance η2 of the radiation side material (stacked structural body 10) is smaller than the wave impedance η1.

Each wave impedance η is determined by the permittivity and permeability of the material and given by Expression (2) below.

$$\eta = \sqrt{(\mu 0 \cdot \mu r / \varepsilon 0 \cdot \varepsilon r)} \quad (2)$$

μ0: vacuum permeability
μr: relative permeability
ε0: vacuum permittivity
εr: relative permittivity Therefore, the wave impedance η1 of the incident side material (air) is given by Expression (3) below, and the wave impedance η2 of the radiation side material (stacked structural body 10) is given by Expression (4) below.

$$\eta 1 = \sqrt{(\mu 0 \cdot \mu r 1 / \varepsilon 0 \cdot \varepsilon r 1)} \quad (3)$$

$$\eta 2 = \sqrt{(\mu 0 \cdot \mu r 2 / \varepsilon 0 \cdot !r2)} \quad (4)$$

Since the wave impedances η1 and η2 are given by Expressions (3) and (4) in this manner, the transmissivity T is determined by the relative permeability μr1 and the relative permittivity εr1 of the free space (air) and the equivalent relative permeability μr2 and the equivalent relative permittivity εr2 of the stacked structural body 10.

In Expression (3), when the relative permeability μr1 and the relative permittivity εr1 of the free space (air) are both taken to be substantially "1" and the equivalent relative permeability μr2 and the equivalent relative permittivity εr2 of the stacked structural body 10 have equal values, the wave impedance η1 of the air and the equivalent wave impedance η2 of the stacked structural body 10 have equal values, and, accordingly, the transmissivity T=1 can be achieved.

When the ratio of the equivalent relative permeability μr2 and the equivalent relative permittivity εr2 of the stacked structural body 10 decreases, in other words when the relative permittivity εr2 as the denominator has a negative value and the absolute value thereof increases, the wave impedance η2 approaches "0", and accordingly, the transmissivity T=0 can be achieved.

However, the relative permeability μr of a non-magnetic body has a value substantially equal to one, whereas the relative permittivity εr of polytetrafluoroethylene, which has the lowest relative permittivity of an industrial material of a typically used non-magnetic body, is two. Thus, the non-magnetic body needs to be mixed with a magnetic material to increase the relative permeability so that the relative permeability is equivalent to the relative permittivity. However, the magnetic material leads to a large loss of electromagnetic waves and is not suitable for use in a mixture or alone.

Thus, in the present disclosure, the equivalent relative permeability μr2 and the equivalent relative permittivity εr2 of the stacked structural body 10 can be set to be equal to each other by forming the stacked structural body 10 as a stack of the first constituent material 11 made of an artificial material having a negative relative permittivity εr in the frequency band I (76.5 GHz) of millimeter waves and the second constituent materials 12 each having a normal positive relative permittivity εr in the frequency band I (76.5 GHz) of millimeter waves.

The stacked structural body 10 needs to be formed such that the equivalent relative permittivity εr of the stacked structural body 10 is equal to the equivalent relative permeability μr=1 in the frequency band I (76.5 GHz) of millimeter waves and the equivalent relative permittivity εr of the stacked structural body 10 is negative and has a large absolute value in the frequency band II (equal to or lower than approximately 1 GHz) of the EMC region (noise control region).

The first constituent material 11 forming the stacked structural body 10 is made of, for example, a conductive material of electronic conduction typically made of metal. However, the first constituent material 11 does not necessarily need to be made of metal but may be made of a conductive material of electronic conduction, but not ion conduction or hole conduction. Examples of a conductive material other than metal include carbon, a conductive macromolecule, a conductive polymer or the like, or a material provided with conductivity by mixing each of these materials into a resin, rubber, elastomer, or the like.

Figure 6:
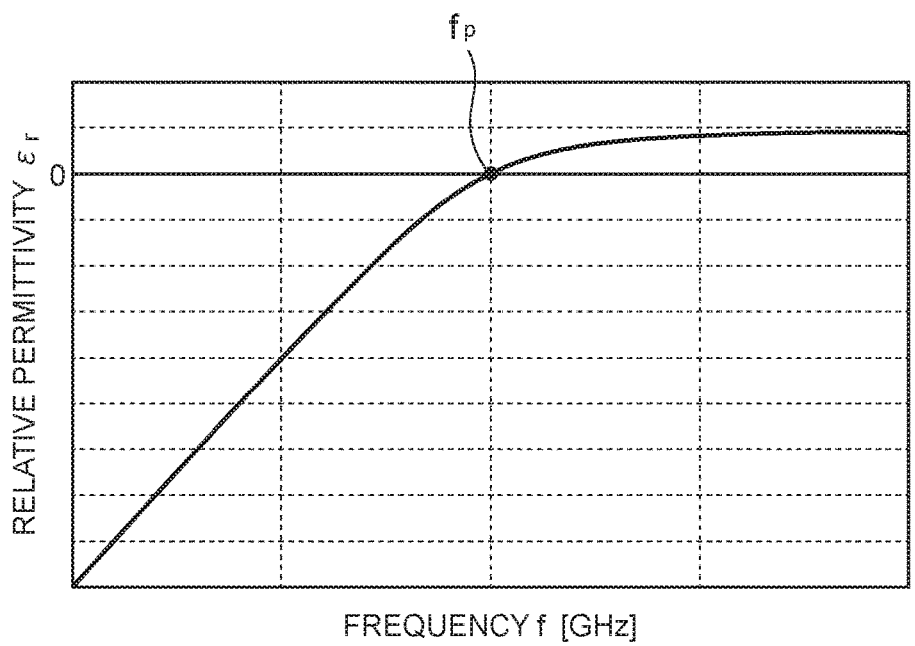
FIG. 6 A graph illustrating the relation between the relative permittivity of a conductive material of electronic conduction and frequency.

The relative permittivity εr of the conductive material used for the first constituent material 11 is described based on a Drude model as an electronic conduction model, and has a positive value at the frequency f (f≥fp) equal to or higher than a plasma frequency fp or a negative value at the frequency f (f<fp) lower than the plasma frequency fp as illustrated in FIG. 6. In the Drude model, the relative permittivity εr of metal is given by the electron mass, electric charge, and the number of conduction electrons, and the plasma frequency fp is a frequency at which the relative permittivity εr is zero.

Figure 7:
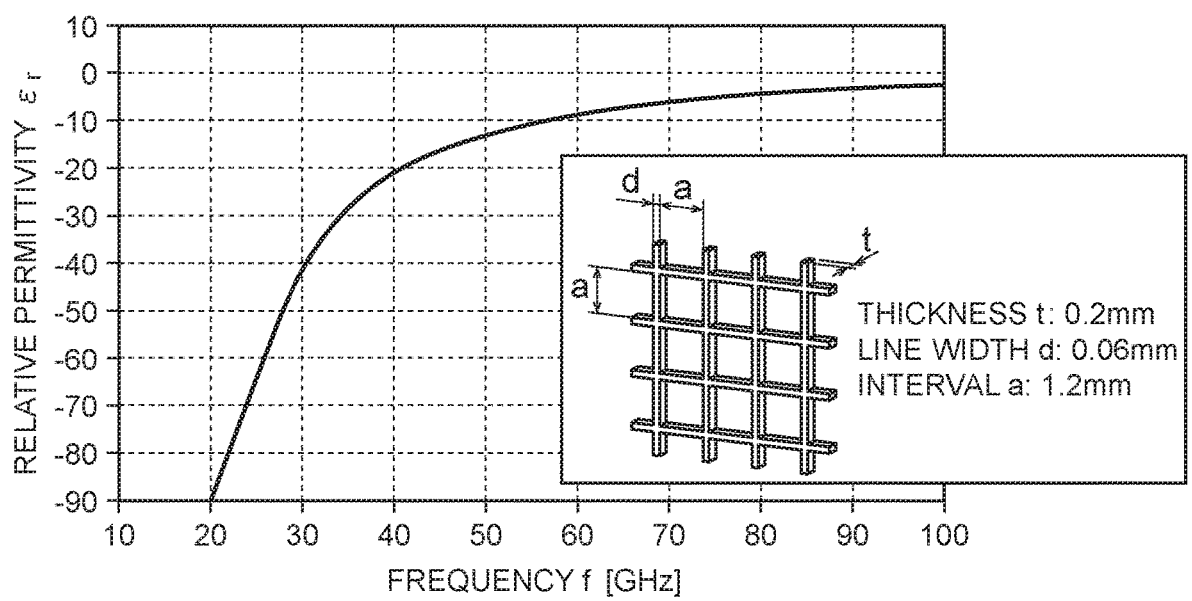
FIG. 7 A graph illustrating the relation between the permittivity of a conductive material in a lattice shape and frequency.

In this case, the plasma frequency fp of the metallic conductive material used for the first constituent material 11 is typically in a frequency band of a light region, and thus, as illustrated in FIG. 7, the plasma frequency fp is set to be near the regions of microwaves, millimeter waves, and terahertz waves so that the frequency band I (76.5 GHz) of millimeter waves is slightly lower than the plasma frequency fp and the relative permittivity εr has a negative value smaller than zero. In this case, in the frequency band II (equal to or lower than approximately 1 GHz) of the EMC region (noise control region), the relative permittivity εr is set to have a negative value equal to or smaller than −500.

The plasma frequency fp in the frequency band of the light region is set to be near the frequency band I (76.5 GHz) of the millimeter wave region as follows: the number of conduction electrons in a conductive material is restricted (decreased) to set the plasma frequency fp of the conductive material made of metal in the light region to be near the millimeter wave region.

Specifically, the number of conduction electrons can be restricted by decreasing the physical dimension and area of the conductive material to reduce the number of conduction electrons in the entire conductive material. Specifically, the restriction can be achieved by forming the first constituent material 11 in a lattice shape as illustrated in FIG. 4 to geometrically dispose the conductive material. In other words, the number of electrons can be physically restricted by reducing the area of the first constituent material 11.

The first constituent material 11 does not necessarily need to be a lattice made of metal (hereinafter also referred to as a "metal lattice"). For example, the first constituent material 11 can be obtained by printing a copper foil pattern on the surface of a polyimide film and then forming the printed film into a lattice shape by etching. The material of the first constituent material 11 and the manufacturing method thereof may be any material and any manufacturing method with which the entire number of conduction electrons can be restricted to obtain a desired relative permittivity εr.

Figure 8:
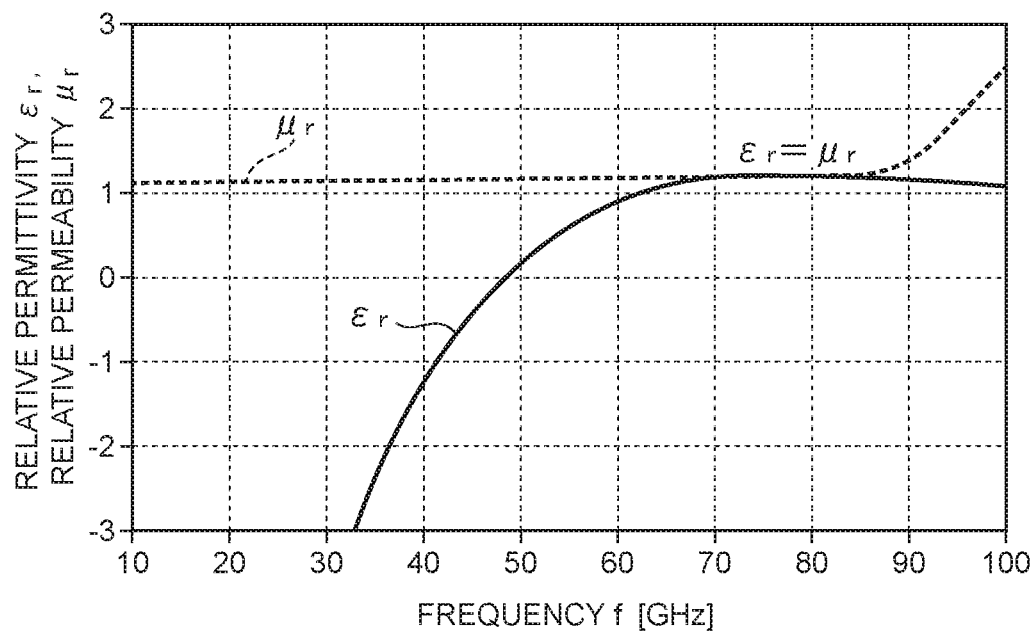
FIG. 8 A graph illustrating calculation results of the relative permittivity and the relative permeability of a stacked structural body.

FIG. 7 illustrates a calculation result of the relative permittivity εr of the first constituent material 11 when each frame forming the lattice has a thickness t of 0.2 mm, a frame width d of 0.06 mm, and an array interval a of 1.2 mm. When the number of electrons is restricted by forming the first constituent material 11 in a lattice shape to reduce the entire area, as illustrated in FIG. 8, the equivalent relative permittivity εr of the stacked structural body 10 can be made equal to the equivalent relative permeability μr=1 and the plasma frequency fp in the frequency band of the light region can be set to be near the frequency band I (76.5 GHz) of the millimeter wave region. As a result, the relative permittivity εr of the first constituent material 11 in the frequency band I (76.5 GHz) depends on the permittivity ε of each second constituent material 12 stacked thereon, but is set to have a designed value of the relative permittivity εr at less than zero and greater than −25, and preferably have a negative value equal to or less than −5, which is between −1 and −10 inclusive approximately. The relative permittivity εr in the frequency band II (equal to or lower than approximately 1 GHz) depends on the permittivity ε of the stacked second constituent material 12, but is set to have a negative value equal to or smaller than −500.

However, the thickness t, the frame width d, and the array interval a of each frame in the lattice of the first constituent material 11 can be set as appropriate in accordance with a desired relative permittivity εr, and an optional shape such as a circular shape or a triangular shape may be selected. The disposition pattern of the lattice does not need to be uniform, but the density such as variance of the lattice may be optionally set.

Each second constituent material 12 is a dielectric having a normal positive relative permittivity εr in the frequency band I (76.5 GHz) of millimeter waves. The second constituent material 12 only needs to have material strength, workability, and various kinds of durability which are necessary for a radar cover, but desirably has a small electric loss to further improve performance. Specifically, the imaginary part ε" when the permittivity ε of the material of the second constituent material 12 in the frequency band I (76.5 GHz) is expressed in a complex permittivity is preferably small, and is, for example, preferably 0.01 or smaller, more preferably 0.005 or smaller.

In this manner, the stacked structural body 10 is formed by stacking at least one layer of the first constituent material 11 having a negative relative permittivity εr (equal to −5 or smaller) in the frequency band I (76.5 GHz) of millimeter waves, and at least one layer of the second constituent material 12 having a positive relative permittivity εr in the frequency band I (76.5 GHz) of millimeter waves.

Accordingly, as illustrated in FIG. 8, the equivalent relative permittivity εr of the stacked structural body 10 having a three-layer structure including the two second constituent materials 12 and the single first constituent material 11 can be made equal to the equivalent permeability μr of the stacked structural body 10, which is equal to one, in the frequency band I (76.5 GHz) of millimeter waves, and the equivalent relative permittivity εr of the stacked structural body 10 can be made negatively large (−500 or smaller) in the frequency band II (equal to or lower than approximately 1 GHz) of the EMC region.

Specifically, it is desirable to set the equivalent relative permittivity εr of the stacked structural body 10 in the frequency band I (76.5 GHz) to be substantially one, specifically, 0.9 to 1.3, more preferably 1.0, and set the equivalent relative permittivity εr of the stacked structural body 10 in the frequency band II (equal to or lower than approximately 1 GHz) to be −370 or smaller, preferably −500 or smaller.

Figure 9:
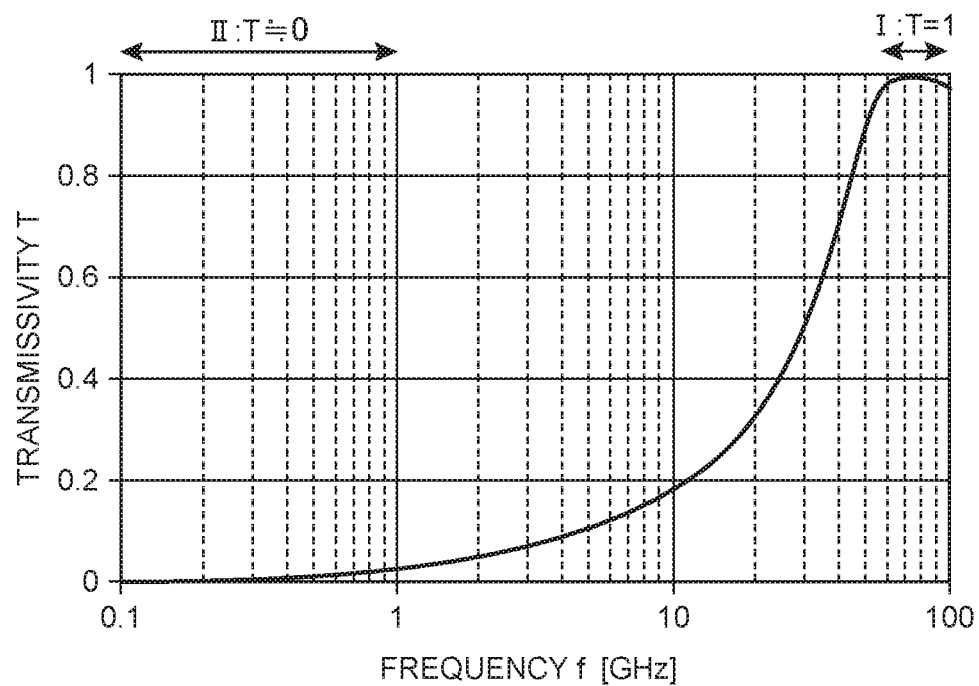
FIG. 9 A graph illustrating the transmissivity of the stacked structural body.

Accordingly, the equivalent relative permeability μr and the relative permittivity εr of the stacked structural body 10 become equal to each other, and the wave impedance η1 of the air and the equivalent wave impedance η2 of the stacked structural body 10 become equal to each other. As a result, as illustrated in FIG. 9, the stacked structural body 10 can obtain the effective transmissivity T=1 in the frequency band I (76.5 GHz).

Simultaneously, as the ratio of the equivalent relative permeability μr and the relative permittivity εr of the stacked structural body 10 decreases when the relative permittivity εr2 as the denominator has a negative value with a large absolute value, the wave impedance η2 approaches to "0", thereby achieving the effective transmissivity T=0 in the frequency band II (equal to or lower than approximately 1 GHz).

Operations and Effects

In the millimeter-wave radar cover 1 with the above-described configuration, the stacked structural body 10 obtained by stacking at least one layer of the first constituent material 11 having a negative relative permittivity in the frequency band I (76.5 GHz) of millimeter waves and at least one layer of the second constituent material 12 having a positive relative permittivity in the frequency band I (76.5 GHz) of millimeter waves is used as a radome at the first site A.

The stacked structural body 10 protects the antenna 30 and the electronic circuit 40 inside through the second constituent materials 12 and achieves the transmissivity T=1 in the frequency band I (76.5 GHz) of millimeter waves, and the transmissivity T≈0 in the frequency band II (equal to or lower than approximately 1 GHz) of the EMC region.

Accordingly, the millimeter-wave radar cover 1 can transmit millimeter electromagnetic waves from the antenna 30 without electric attenuation due to the stacked structural body 10, and receive reflected waves thereof without electric attenuation due to the stacked structural body 10. Simultaneously, the millimeter-wave radar cover 1 can, through the stacked structural body 10, reduce unnecessary radiation of electromagnetic waves in the EMC region and prevent interference and cross talk due to electromagnetic waves from another external instrument.

Example

In a specific configuration of the stacked structural body 10, for example, the first constituent material 11 was made of a metal lattice of copper, each second constituent material 12 was made of polyimide, the first constituent material 11 and the second constituent material 12 each had a size of 200×200 mm, and one of the second constituent materials 12, the first constituent material 11, and the other second constituent material 12 were stacked in the stated order to achieve a three-layer stacked structure.

The first constituent material 11 was produced by etching a copper foil having a thickness t of 0.08 mm into a lattice shape having a line width d of 0.06 mm, an array interval a of 1.2 mm in the longitudinal direction, and an array interval a of 1.2 mm in the lateral direction. In this case, the plasma frequency fp of the relative permittivity εr of the first constituent material 11 in the frequency band of the light region can be set to be near the frequency band I (76.5 GHz) of the millimeter wave region. Each second constituent material 12 was made of a polyimide having a complex relative permittivity of 3.25−j0.001 in the frequency band I (76.5 GHz) of millimeter waves and had a thickness of 0.31 mm.

The second constituent material 12, the first constituent material 11, and the other second constituent material 12 were sequentially stacked and subjected to press molding under a pressure of 60 t by using an adhesive to form the stacked structural body 10 having a three-layer stacked structure. As a result, the thickness of the formed stacked structural body 10 was 0.62 mm. In this state, the first constituent material 11 was sandwiched between the two second constituent materials 12 with no air between the three layers.

In this case, for example, the relative permittivity εr and the relative permeability μr of each of the first constituent material 11 and the second constituent materials 12 of the stacked structural body 10 having a three-layer stacked structure including the adhesive were adjusted appropriately to achieve the transmissivity T=1 in the frequency band I (76.5 GHz) of millimeter waves and the transmissivity T≈0 in the frequency band II (equal to or lower than approximately 1 GHz) of the EMC region.

A result of measurement of the equivalent relative permittivity εr and the equivalent relative permeability μr of the stacked structural body 10 is as illustrated in FIG. 8. In addition, as illustrated in FIG. 9, the transmissivity T of the stacked structural body 10 achieves the transmissivity T=1 in the frequency band I (76.5 GHz) of millimeter waves and the transmissivity T≈0 in the frequency band II (equal to or lower than approximately 1 GHz) of the EMC region.

Other Embodiments

Figure 10:
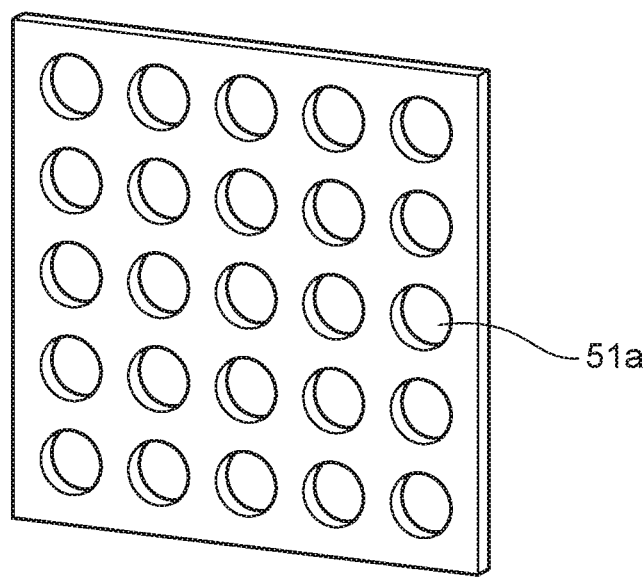
FIG. 10 A simplified perspective view illustrating the configuration of the second constituent material made of a conductive material in a hole array shape in another embodiment.
Figure 10:
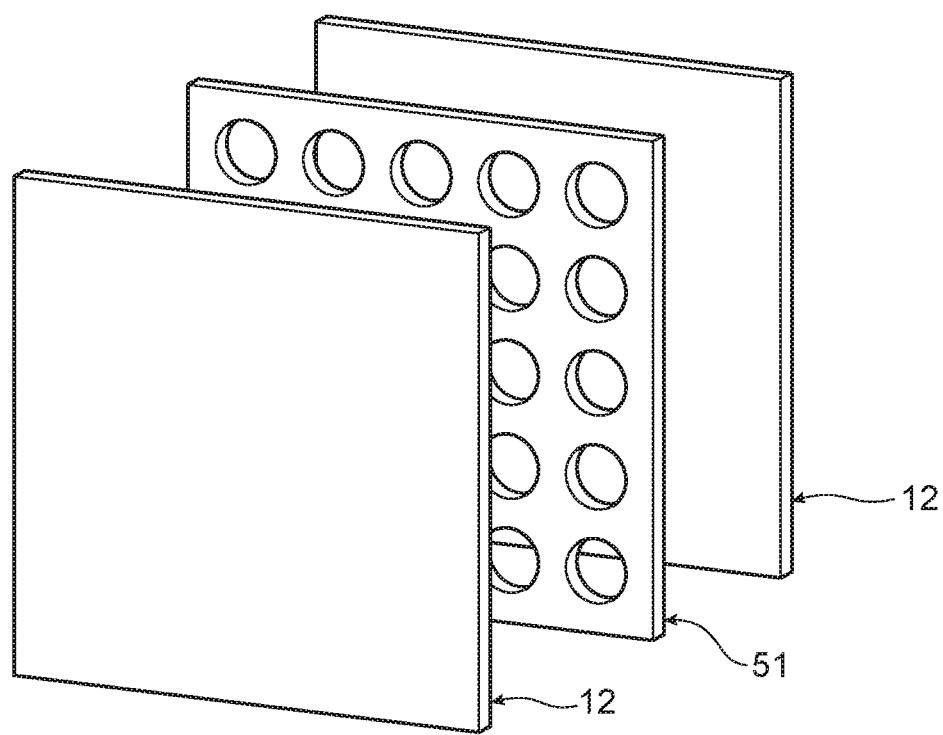

In the above-described embodiment, a case in which, for example, a metal lattice obtained by geometrically forming a conductive material is used as the first constituent material 11 is described. However, the present disclosure is not limited thereto, but a three-layer stacked structural body 10s in which a hole array in which a plurality of penetrating minute holes 51a (holes) are formed in a plate member made of a conductive material of electronic conduction such as metal is used as a first constituent material 51 and sandwiched between the two second constituent materials 12 as illustrated in FIGS. 10 (A) and (B), or a two-layer stacked structural body of the first constituent material 11 and one of the second constituent materials 12 may be possible. The plasma frequency fp of the equivalent relative permittivity εr of the first constituent material 51 in the light region can be set to be in the millimeter wave region. In this case, the frequency characteristic of the relative permittivity εr can be changed by changing the size of each minute hole 51a of the first constituent material 51 and the number thereof.

In this case, when electromagnetic waves from the antenna 30 are incident on the stacked structural body 10s, a magnetic dipole occurs at a minute hole 51a. This magnetic dipole is equivalent to a loop current of a loop antenna, and thus electromagnetic waves at a frequency different from the incident frequency are radiated again from this location depending on the magnitude of the magnetic dipole.

Some preferable embodiments of the present disclosure are described above, but the present disclosure is not limited to the millimeter-wave radar cover 1 according to the above-described embodiments and includes all aspects included in the concept and claims of the present disclosure. In addition, configurations may be selectively combined as appropriate to achieve at least part of the described above problem and effect. For example, the shape, material, disposition, size, and the like of each component in the above-described embodiments may be changed appropriately depending on a specific use aspect of the present disclosure.

INDUSTRIAL APPLICABILITY

A millimeter-wave radar cover of the present application disclosure is not only for automotive application to an automobile or the like, and can be used not only in the fields of transport means such as railways, aircraft, and ships, but also in the fields of electric and electronic devices and other industrial machines.

What is claimed is:
1. A millimeter-wave radar cover housing a millimeter-wave radar including an antenna and an electronic circuit configured to drive the antenna, the millimeter-wave radar cover being characterized by comprising:
   a first site provided in front of the millimeter-wave radar to protect the millimeter-wave radar and transmit millimeter electromagnetic waves emitted from the antenna; and
   a second site including a housing space in which the antenna and the electronic circuit except for the first site are housed,
   wherein the first site is made of a stacked structural body obtained by stacking at least one layer of a first constituent material having a negative relative permittivity in the frequency band of the millimeter waves and at least one layer of a second constituent material having a positive relative permittivity in the frequency band of the millimeter waves,
   the first constituent material is formed by geometrically disposing a conductive material, and
   the stacked structural body formed when the first constituent material is stacked with the second constituent material, has a relative permittivity and a relative permeability equal to each other for the frequency band of the millimeter waves, and the stacked structural body has an effective transmissivity close to one for the frequency band of the millimeter waves, and an effective transmissivity close to zero for a frequency band equal to or lower than 1 GHz, which is lower than the frequency band of the millimeter waves, and the first constituent material has the negative relative permittivity in the frequency band of the millimeter waves by a restricted number of conduction electrons.

2. The millimeter-wave radar cover according to claim 1, characterized in that the first constituent material is made of a conductive material formed in a lattice shape or a hole array shape.

3. The millimeter-wave radar cover according to claim 1, characterized in that the second constituent material is made of a dielectric material that protects the antenna and the electronic circuit from outside.

4. The millimeter-wave radar cover according to claim 1, characterized in that the second site has a transmissivity of zero for perfect screening in the frequency band of the millimeter waves and the frequency band equal to or lower than 1 GHz.

5. The millimeter-wave radar cover according to claim 1, wherein the stacked structural body has an effective transmissivity close to one in a first frequency band of about 76.5 GHz.

* * * * *